(12) United States Patent
Ito et al.

(10) Patent No.: US 7,116,052 B2
(45) Date of Patent: Oct. 3, 2006

(54) VEHICULAR LAMP

(75) Inventors: Masayasu Ito, Shizuoka-ken (JP); Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 213 days.

(21) Appl. No.: 10/831,090

(22) Filed: Apr. 23, 2004

(65) Prior Publication Data

US 2004/0213015 A1    Oct. 28, 2004

(30) Foreign Application Priority Data

Apr. 28, 2003    (JP) .............................. 2003-124430

(51) Int. Cl.
  *B60Q 1/14*      (2006.01)
  *B60Q 11/00*     (2006.01)
  *H05B 41/36*     (2006.01)
  *F21V 21/00*     (2006.01)

(52) U.S. Cl. .................. 315/77; 315/291; 340/458; 362/545

(58) Field of Classification Search .............. 315/291, 315/307, 312, 324, 325, 77, 82; 340/458; 362/545

See application file for complete search history.

(56) References Cited

U.S. PATENT DOCUMENTS

| | | | |
|---|---|---|---|
| 5,095,502 A * | 3/1992 | Finzel ..................... | 379/40 |
| 6,348,766 B1 * | 2/2002 | Ohishi et al. ........... | 315/200 A |
| 6,396,466 B1 * | 5/2002 | Pross et al. ............. | 345/82 |
| 6,490,512 B1 * | 12/2002 | Niggemann ............. | 701/29 |
| 6,858,994 B1 * | 2/2005 | Vollrath ................. | 315/200 A |
| 6,864,641 B1 * | 3/2005 | Dygert .................. | 315/216 |
| 6,972,674 B1 * | 12/2005 | Ohmi .................... | 340/458 |
| 2002/0140380 A1 * | 10/2002 | Biebl .................... | 315/291 |
| 2003/0025465 A1 * | 2/2003 | Swanson et al. ........ | 315/291 |
| 2003/0227257 A1 * | 12/2003 | Serizawa et al. ........ | 315/77 |

FOREIGN PATENT DOCUMENTS

DE    100 25 821 A1    7/2002
JP    2002-231014      8/2002

OTHER PUBLICATIONS

Patent Abstracts of Japan; Publication No. 2002-231014 dated Aug. 16, 2002 ( 1 pg.).
German Office Action dated Dec. 30, 2005.

* cited by examiner

*Primary Examiner*—Don Wong
*Assistant Examiner*—Angela M Lie
(74) *Attorney, Agent, or Firm*—Osha Liang LLP

(57) ABSTRACT

Electric current supplied to light source rows of a vehicular lamp is controlled appropriately. The vehicular lamp includes: a plurality of semiconductor light emitting devices connected in parallel; a wire breakage detecting unit detecting wire breakage of each of the plurality of semiconductor light emitting devices; and an electric current supplying unit supplying a predetermined electric current to the plurality of semiconductor light emitting devices. The electric current supplying unit decreases the electric current to be supplied to the plurality of semiconductor light emitting devices when the wire breakage detecting unit detects wire breakage of at least one of the plurality of semiconductor light emitting devices.

2 Claims, 5 Drawing Sheets

VEHICULAR LAMP

The present application claims priority from a Japanese Patent Application No. 2003-124430 filed on Apr. 28, 2003, the contents of which are incorporated herein by reference.

BACKGROUND OF THE INVENTION

1. Field of the Invention

The present invention relates to a vehicular lamp. More particularly, the present invention relates to a headlamp, a stop lamp, a tail lamp, a turn lamp, and the like used for a vehicle including automobiles, motorcycles and trains.

2. Related Art

A vehicular lamp employing a semiconductor light emitting device is known (e.g., Japanese Patent Laid-Open No. 2002-231014 bulletin (page 3–6, FIG. 1–13)). In general, the vehicular lamp has to be on stably for safety reasons.

However, if the excessive electric current flows in the semiconductor light emitting device, the life of the semiconductor light emitting device may become shorter due to heat generation. Therefore, for the vehicular lamp using a semiconductor light emitting device, it is desirable to control the current to the semiconductor element accurately.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claim. The dependent claims define further advantageous and exemplary combinations of the present invention.

According to a first aspect of the present invention, there is provided a vehicular lamp, including: a plurality of semiconductor light emitting devices connected in parallel; a wire breakage detecting unit detecting wire breakage of each of the plurality of semiconductor light emitting devices; and an electric current supplying unit supplying a first electric current to the plurality of semiconductor light emitting devices, wherein the electric current supplying unit decreases the electric current to be supplied to the plurality of semiconductor light emitting devices from the first electric current to a second electric current, which is lower than the first electric current, when the wire breakage detecting unit detects wire breakage of at least one of the plurality of semiconductor light emitting devices.

The electric current supplying unit may decrease the electric current to be supplied to the plurality of semiconductor light emitting devices from the second electric current to a third electric current, which is lower than the second electric current, when the wire breakage detecting unit detects wire breakage of at least two of the plurality of semiconductor light emitting devices.

The vehicular lamp may further include: a plurality of electric current detecting units provided corresponding to the plurality of semiconductor light emitting devices, each of the plurality of electric current detecting units detecting electric current flowing through corresponding one of the plurality of semiconductor light emitting devices; and an average electric current value output unit selecting at least one of the plurality of electric current detecting units corresponding to respective one(s) of the plurality of semiconductor light emitting devices of which the wire breakage is not detected by the corresponding wire breakage detecting unit, and outputting an average value of electric current detected by the selected electric current detecting unit. The electric current supplying unit may decreases the electric current to be supplied to the plurality of semiconductor light emitting devices so that the average value may be maintained substantially constant when at least one of the wire breakage detecting units detects wire breakage of respective one(s) of the semiconductor light emitting devices.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
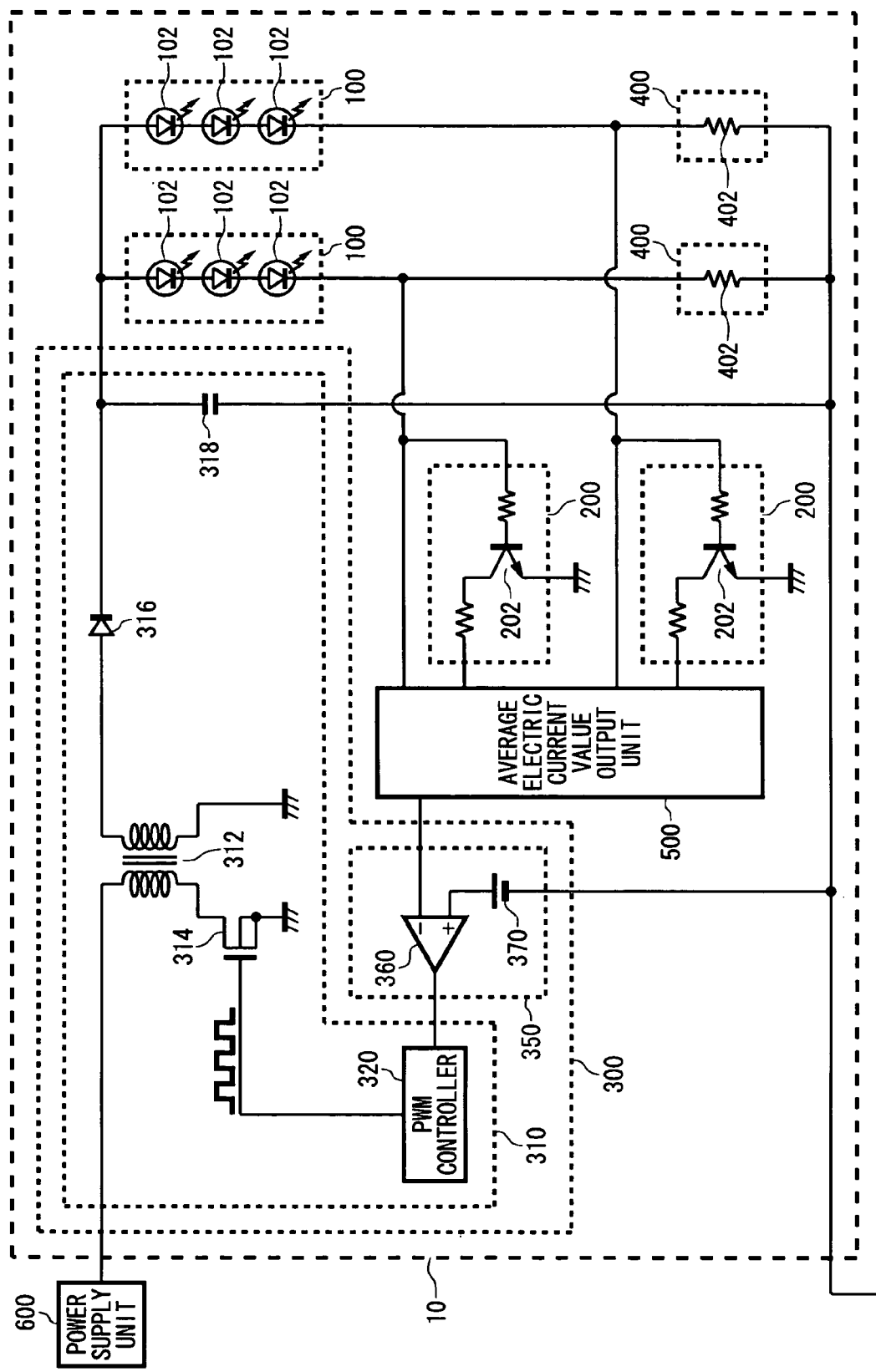
FIG. 1 is a circuit diagram illustrating a configuration of a vehicular lamp 10 and a power supply unit 600 according to an embodiment of the present invention.

FIG. 1 is a circuit diagram illustrating a configuration of a vehicular lamp 10 and a power supply unit 600 according to an embodiment of the present invention. In the present embodiment, the vehicular lamp 10 is configured for supplying electric current appropriately to semiconductor light emitting devices 102 included in the vehicular lamp 10. The power supply unit 600 supplies electric power to the vehicular lamp 10. The electric power may be dependent on the power of a battery loaded on a vehicle.

For example, the vehicular lamp 10 is a headlamp of vehicle for lighting road ahead of the vehicle. Alternatively, the vehicular lamp 10 is, but not limited to, a stop lamp, a tail lamp, a turn lamp, or the like. The vehicular lamp 10 includes a plurality of light source rows 100, a plurality of electric current detecting units 400, a plurality of wire breakage detecting units 200, an average electric current output unit 500, and an electric current supplying unit 300.

The plurality of light source rows 100 are connected in parallel and receive electric power from the electric current supplying unit 300. In the present embodiment, each of the plurality of the light source rows 100 includes a plurality of semiconductor light emitting devices 102 connected in forward direction and in series. For example, the plurality of semiconductor light emitting devices 102 are light emitting diodes. Alternatively, in another examples, each of the light source rows 100 includes single light emitting device 102.

Each of the plurality of electric current detecting units 400 is provided corresponding to each of the light source rows 100. In the present embodiment described in reference to FIG. 1, each of the electric current detecting units 400 includes a resistor 402. One terminal of the resistor 402 is connected to the cathode of the serially connected light emitting devices 102 while the other terminal of the resistor 402 is grounded. In this case, the voltage between the cathode of the light emitting devices 102 and the resistor 402 corresponds to electric current detection voltage, which is the voltage according to the electric current flowing through the corresponding light source row 100. Thereby, each of the electric current detecting units 400 detects the electric current flowing through the corresponding light source row 100.

Each of the plurality of wire breakage detecting units 200 is provided corresponding to each of the electric current detecting units 400. Each of the wire breakage detecting unit 200 includes an NPN transistor 202 and a plurality of resistors. The collector terminal of the NPN transistor 202 connects with the average electric current value output unit 500 via a resistor. When the NPN transistor 202 is turned on, the NPN transistor 202 sinks the collector current, so that the voltage of the output terminal of the transistor 202, which connects with the average electric current value output unit 500, decreases. The base terminal of the NPN transistor 202 connects with a node between the light emitting devices 102 and the electric current detecting unit 400 for the detection of the electric current detection voltage.

If the wire in one of the semiconductor light emitting devices 102 is broken, the electric current detection voltage is decreased because the electric current does not flow through the electric current detecting unit 400 corresponding to the light source row 100 including the wire-broken semiconductor light emitting device 102. The NPN transistor 202 will be turned OFF according to the decrement of the electric current detection voltage. Thereby, each of the plurality of wire breakage detecting units 200 detects the wire breakage of corresponding one of the plurality of light source rows 100. Moreover, the wire breakage detecting unit 200 supplies the average electric current value output unit 500 with information on whether the wire of the corresponding light source row 100 is broken or not.

The wire of the light source row 100 is broken by the wire breakage of at least one of the plurality of semiconductor light emitting devices 102 connected in series. Each of the wire breakage detecting units 200 may detect the wire breakage of each of the plurality of semiconductor light emitting devices 102 connected in parallel.

The average electric current value output unit 500 receives electric current detection voltage from the electric current detecting units 400, and receives the information on whether the wire of each of the light source row 100 is broken or not from corresponding one of the wire breakage detecting units 200. Then, the average electric current value output unit 500 selects an electric current detecting unit 400 corresponding to the light source row 100 of which the wire breakage is not detected by the corresponding wire breakage detecting unit 200 according to the information. Then, the average electric current value output unit 500 computes the average of the electric current detected by the selected electric current detecting unit 400, and outputs the average voltage to the electric current supplying unit 300.

The electric current supplying unit 300 includes a voltage comparing unit 350 and an electric current output unit 310.

The voltage comparing unit 350 includes a constant voltage source 370 and an operational amplifier 360. For example, the constant voltage source 370 is a battery and outputs a predetermined reference voltage. The reference voltage is input into the positive input of the operational amplifier 360, and the average voltage output from the average electric current value output unit 500 is input into the negative input of the operational amplifier 360. The operational amplifier 360 compares the average voltage with the reference voltage, and the difference between the average voltage and the reference voltage is amplified and output to the electric current output unit 310.

The electric current output unit 310 is a switching regulator circuit, and includes a PWM controller 320, an NMOS transistor 314, a transformer 312, a diode 316, and a capacitor 318.

The PWM controller 320 receives the amplified voltage difference between the average voltage and the reference voltage from the voltage comparing unit 350, and outputs the control signal for controlling the NMOS transistor 314 based on the amplified voltage difference. In the present embodiment, the PWM controller 320 controls an ON-OFF time ratio of the NMOS transistor 314 by supplying a pulsed control signal to a gate terminal of the NMOS transistor 314. Moreover, when the average voltage is lower than the reference voltage, the PWM controller 320 increases the duty ratio of the reference voltage, and when the average voltage is higher than the reference voltage, the PWM controller 320 decreases the duty ratio of the reference voltage.

The NMOS transistor 314 connects with the primary coil of the transformer 312 in series, and regulates the output current from the transformer by the ON-OFF of the NMOS transistor 314 according to the pulsed control signal so that the output current may associate with the duty ratio of the control signal. Therefore, the transformer 312 increases the output current when the average voltage is lower than the reference voltage, or it decreases the output current when the average voltage is higher than the reference voltage. The diode 316 rectifies the output current from the transformer 312. The capacitor 318 smoothes the electric current rectified by the diode 316, and supplies the current to the plurality of light source rows 100.

Thereby, the electric current output unit 310 changes the electric current supplied to the plurality of light source rows 100 based on the difference between the average voltage and the reference voltage. The electric current output unit 310 increases the electric current to be supplied to the light source rows 100 when the average voltage is lower than the reference voltage, and it decreases the current when the average voltage is higher than the reference voltage. Thereby, the electric current output unit 310 supplies the light source rows 100 with constant current so that the average voltage becomes substantially equal to the reference voltage. Therefore, a predetermined and constant electric current is supplied to the plurality of light source units 100 by the electric current supplying unit 300.

In the present embodiment, the average electric current value output unit 500 outputs the average of the electric current detection voltage corresponding to the light source row 100 of which the wires is not broken, as the average voltage. For example, when the wire of one of the light source rows 100 is broken, the electric current detection voltage corresponding to the light source row 100 does not influence the average voltage output from the average electric current value output unit 500.

Moreover, when the wire of at least one of the light source rows 100 is broken, since the quantity of the light source rows 100, to which electric current is to be supplied, may decrease, the total electric supply from the electric current supplying unit 300 will decrease so that the average voltage may be maintained substantially constant. Thereby, the electric current supplying unit 300 maintains the electric current flowing through each of the light source units 100 of which the wire is not broken to be constant. Therefore, according to the present embodiment, the electric current supplied to the semiconductor light emitting devices 102 is controllable highly accurately.

The cost of the vehicular lamp 10 might increase if a plurality of current regulator circuits were to be provided to the plurality of light source rows 100, respectively. However in the present embodiment, since the vehicular lamp 10 employs single electric current supplying unit 300 to supply the electric current to the plurality of light source rows 100, the cost of the vehicular lamp can be reduced.

Figure 2:
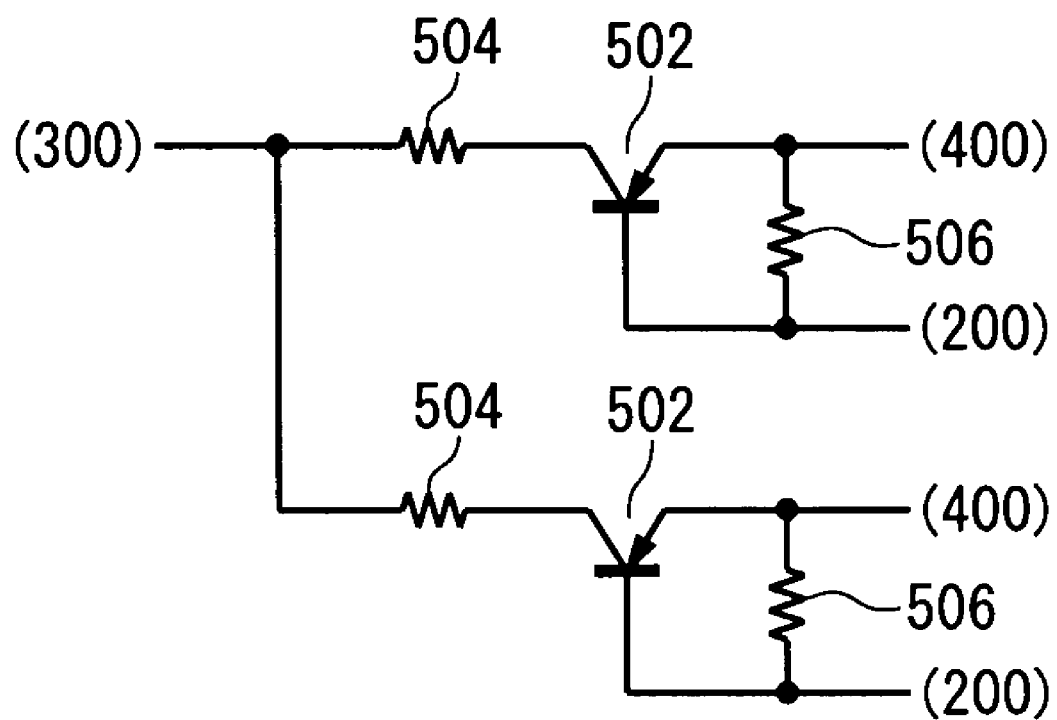
FIG. 2 is a circuit diagram illustrating a configuration of an average electric current value output unit 500 according to an embodiment of the present invention.

FIG. 2 is a circuit diagram exemplary illustrating a configuration of the average electric current value output unit 500. In the present embodiment, the average electric current value output unit 500 includes a plurality of PNP transistors 502, a plurality of resistors 504, and a plurality of resistors 506. Each of the plurality of PNP transistors 502 is provided corresponding to each of the plurality of light source rows 100 (refer to FIG. 1). Each of the plurality of resistor 504 and each of the plurality of resistors 506 are also provided corresponding to each of the plurality of PNP transistors 502.

The electric current detection voltages are supplied to an emitter terminal of each of the PNP transistors 502 from corresponding one of the electric current detecting units 400, and the output of each of the wire breakage detecting units 200 is supplied to a base terminals of corresponding one of the PNP transistors 502. Moreover, collector terminals of the PNP transistors 502 connect with the electric current supplying unit 300 via the corresponding resistors 504.

In the present embodiment, the wire breakage detecting unit 200 sinks its output when the wire breakage of the corresponding light source row 100 is not detected, and consequently, the corresponding PNP transistor 502 is turned ON and connects the corresponding electric current detecting unit 400 and the electric current supplying unit 300 through the corresponding resistor 504. Thereby, the average electric current value output unit 500 selects an electric current detecting unit 400 corresponding to the light source row 100 of which the wire is not broken. The input terminal of the electric current supplying unit 300 connects with the selected electric current detecting unit 400 through the corresponding PNP transistor 502 and the corresponding resistor 504.

Moreover in the present embodiment, the plurality of resistors 504 are connected to each other by the terminals connected to the electric current supplying unit 300. Therefore, the voltage at a node between the plurality of resistors 504 and the electric current supplying unit 300 is the average voltage of the electric current detection voltages output from the selected electric current detecting units 400. Thereby, the average electric current value output unit 500 supplies the average of the electric current detection voltage to the electric current supplying unit 300 as the average voltage.

In addition, the resistor 506 connects the emitter terminal and the base terminal of the PNP transistor 502. Thereby, the electric current detection voltage received from the electric current detecting unit 400 is supplied to the base terminal of the PNP transistor 502 via the resistor 506 to turn OFF the PNP transistor 502 when the corresponding wire breakage detecting unit 200 does not detect the wire breakage.

In the present embodiment, it is preferable that the resistance of the resistor 506 is higher than the resistance of the resistor 402 in the electric current detecting unit 400 (refer to FIG. 1), so that the resistor 506 can decrease the electric current flowing from the upstream or non-grounded side of the current detecting unit 400 into the average electric current value output unit 500.

Although there are shown only two light source rows 100 in FIG. 1, the quantity of the light source rows 100 is not limited to a specific range of values. Moreover, although there are shown only three semiconductor light emitting devices 102 in each of the light source rows 100 in FIG. 1, the quantity of the semiconductor light emitting devices 102 is not limited to a specific range of values. Consequently, the quantity of the PNP transistors 502, resistors 504, and the resistors 506 may correspond to the quantity of the light source rows 100. Still in this case, the average electric current value output unit 500 can appropriately output the average of electric current detection voltage of the light source row 100 of which the wire is not broken.

Figure 3:
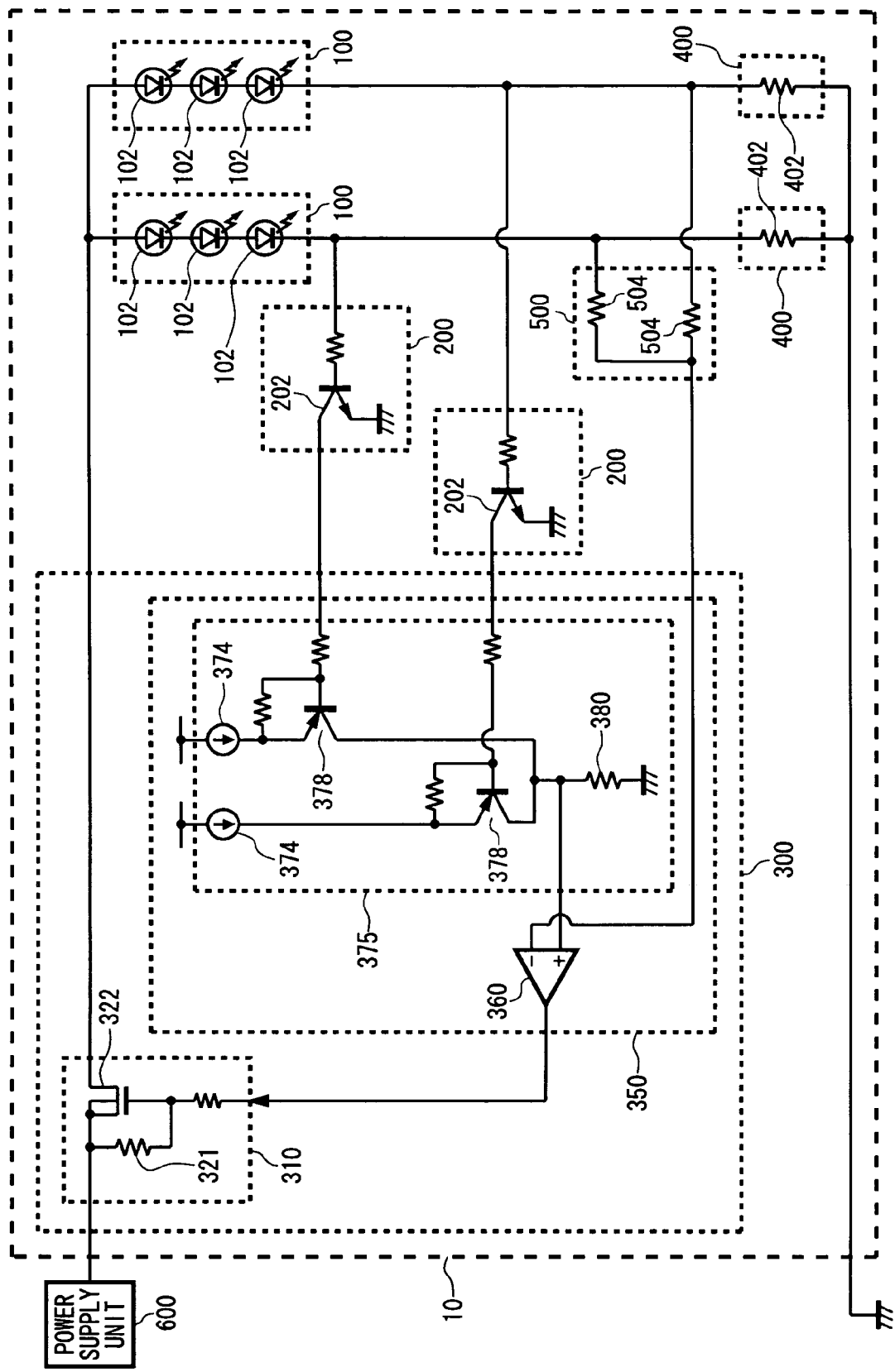
FIG. 3 is a circuit diagram illustrating a configuration of the vehicular lamp 10 and the power supply unit 600 according to another embodiment of the present invention.

FIG. 3 is a circuit diagram illustrating another example of a configuration of the vehicular lamp 10 and the power supply unit 600. The components that correspond to those of FIG. 1 are numbered identically and the explanation of those components will be omitted to avoid redundancy.

In the present embodiment, the transistor 202 is an open collector NPN transistor, and when the wire breakage of the corresponding light source row 100 is detected, the NPN transistor 202 is turned OFF and output an H signal (high impedance or high level). When the wire breakage of the corresponding light source row 100 is not detected, the NPN transistor 202 is turned ON and outputs an L signal (low level).

Moreover in the present embodiment, the average electric current value output unit 500 includes a plurality of resistors 504. Each of the plurality of resistors 504 is provided corresponding to each of the plurality of electric current detecting units 400. One terminal of each of the resistors 504 connects with the upstream, non-grounded side of the corresponding electric current detecting unit 400, and the other terminal of each of the resistors 504 connects with the electric current supplying unit 300.

The plurality of resistors 504 connects with each other by the terminals connecting with the electric current supplying unit 300. Thereby, the plurality of resistors 504 connect upstream or non-grounded sides of the plurality of resistors 402. Moreover, the average electric current value output unit 500 supplies the electric current supplying unit 300 with the voltage of the node at which the plurality of resistors 504 connect with each other as the average voltage, which is the output voltage of the average electric current value output unit 500.

Therefore, when there is no wire breakage of the light source rows 100, the average electric current value output unit 500 supplies the electric current supplying unit 300 with the average of the electric current detection voltage received from the electric current detecting units 400. Moreover, when the wire of one of the light source rows 100 is broken, since the voltage of the non-grounded side of the resistor 402 corresponding to the wire-broken light source row 100 decreases, the electric current flows from the cathode of the light source row 100 of which the wire is not broken through the plurality of resistors 504 to the cathode of the light source row 100 of which the wire is broken. In this case, the voltage output from the average electric current value output unit 500 is lower than the electric current detection voltage in the case that there is no wire breakage of the light source rows 100. For example, the electric current detection voltage when there is no wire breakage of the light source rows 100 may be decreased according to the quantity of the light source row 100 of which the wire is broken, and the average electric current value output unit 500 may output the decreased voltage.

Moreover in the present embodiment, the resistance of the resistor 504 is higher than that of the resistor 402. Therefore, when the wire of one light source row 100 out of the two light source rows 100 is broken, for example, the voltage output from the average electric current value output unit 500 to the electric current supplying unit 300 becomes substantially the half of the electric current detection voltage corresponding to the other light source row 100. Thereby, the voltage output from the average electric current value output unit 500 is substantially in proportion to the output current from the electric current supplying unit 300 divided by the quantity of the light source row 100. The average electric current value output unit 500 may output the average of electric current detection voltage of all of the electric current detecting units 400.

The electric current supplying unit 300 includes a voltage comparing unit 350 and an electric current output unit 310. The voltage comparing unit 350 includes an operational amplifier 360 and a reference voltage generating unit 375. In the present embodiment, the reference voltage generating unit 375 includes a plurality of constant current sources 374, a plurality of PNP transistors 378, and a plurality of resistors. The plurality of constant current sources 374 and the plurality of PNP transistors 378 are provided corresponding to the plurality of light source rows 100. The constant current source 374 is a constant current circuit, of which the output is connected to the emitter terminal of the PNP transistor 378. The constant current source 374 supplies the resistor 380 via the PNP transistor 378 with substantially constant electric current when the PNP transistor 378 is turned ON. The PNP transistor 378 is turned ON by receiving the output of the wire breakage detecting unit 200 at the base of the PNP transistor 378 via a resistor when the wire of the corresponding light source row 100 is not broken.

One terminal of the resistor 380 connects with the collector terminals of the plurality of PNP transistors 378, and the other terminal is grounded. In this case, the resistor 380 receives substantially constant electric current from the constant current source 374 corresponding to the light source row 100 of which the wire is not broken. Thereby, the voltage of the non-grounded terminal of the resistor 380 increases according to the quantity of the light source row 100 of which the wire is not broken. The reference voltage generating unit 375 outputs this voltage to the operational amplifier 360 as the reference voltage. The reference voltage generating unit 375 may output the reference voltage which is in proportion to the quantity of the light source row 100 of which the wire is not broken.

Moreover, the operational amplifier 360 compares the reference voltage with the average voltage received from the average electric current value output unit 500. Thereby, the voltage comparing unit 350 supplies the electric current output unit 310 with the comparison result.

For example, the electric current output unit 310 is an electric current clamping circuit and includes a PMOS transistor 322 and a plurality of resistors. The PMOS transistor 322 connects the power supply unit 600 and the plurality of light source rows 100. Moreover, the output of the voltage comparing unit 350 is supplied to the gate terminal of the PMOS transistor 322 pulled up by the resistor 321. Thereby, the PMOS transistor 322 supplies the plurality of light source rows 100 with the electric current according to the output of the operational amplifier 360. For example, the PMOS transistor 322 decreases the output current when the average voltage is higher than the reference voltage. On the other hand, the PMOS transistor 322 increases the output current when the average voltage is lower than the reference voltage. Thereby, the electric current output unit 310 outputs constant electric current so that the average voltage becomes substantially equal to the reference voltage.

Moreover, in the case that the wire of one of the light source rows 100 is broken, the constant voltage source 370 decreases the reference voltage. Moreover, the average electric current value output unit 500 decreases the average voltage. In this case, the electric current output unit 310 decreases its output voltage so that the decreased average voltage becomes substantially equal to the decreased reference voltage. Therefore, also in the present embodiment, the electric current output from the electric current output unit 310 can be appropriately decreased according to the wire breakage of the light source row 100. Therefore, according to the present embodiment, the electric current to be supplied to the semiconductor light emitting devices 102 is controllable highly accurately.

Alternatively, the electric current output unit 310 is provided downstream of the plurality of light source rows 100. In this case, the electric current output unit 310 includes an NMOS transistor instead of the PMOS transistor 322, for example. The function and configuration of the electric current output unit 310 in the present embodiment may be similar to those of the electric current output unit 310 illustrated in FIG. 1, instead of employing those illustrated in FIG. 3.

Although there are shown only two light source rows 100 in FIG. 3, the quantity of the light source rows 100 is not limited to a specific range of values. Moreover, although there are shown only three semiconductor light emitting devices 102 in each of the light source rows 100 in FIG. 3, the quantity of the semiconductor light emitting devices 102 is not limited to a specific range of values. Consequently, the quantity of the plurality of the resistor 504 may correspond to the quantity of the light source rows 100. Still in this case, the average electric current value output unit 500 can decrease the electric current detection voltage of the electric current detecting unit 400 according to the quantity of the light source row 100 of which the wire is not broken, and output the decreased voltage.

Figure 4:
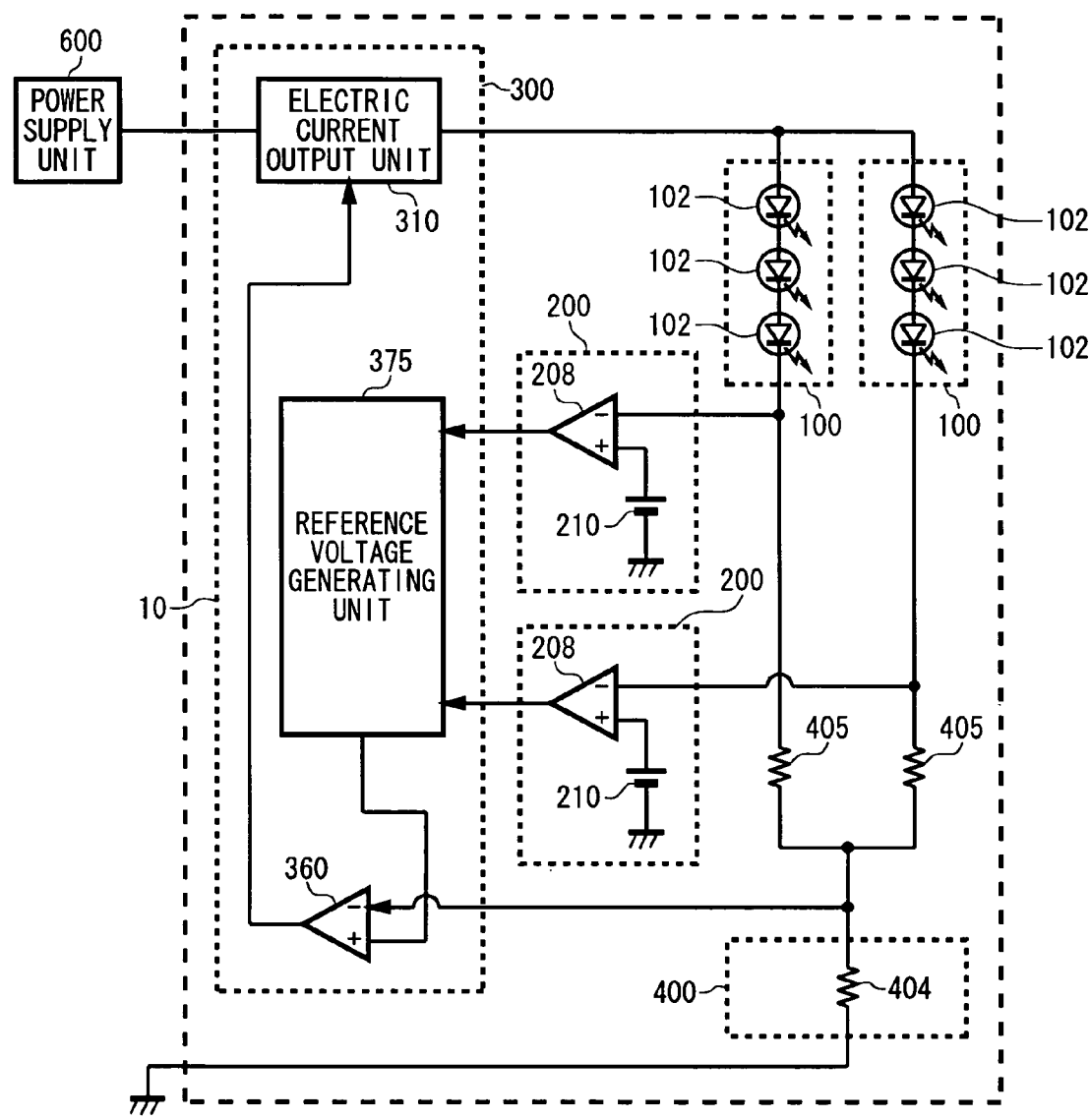
FIG. 4 is a circuit diagram illustrating a configuration of the vehicular lamp 10 and the power supply unit 600 according to yet another embodiment of the present invention.

FIG. 4 is a circuit diagram illustrating yet another example of a configuration of the vehicular lamp 10 and the power supply unit 600. The components that correspond to those of FIG. 1 and FIG. 3 are numbered identically and the explanation of those components will be omitted to avoid redundancy.

In the present embodiment, the vehicular lamp 10 includes single electric current detecting unit 400 corresponding to the plurality of light source rows 100. Moreover, the vehicular lamp 10 further includes a plurality of resistors 405 which are provided corresponding to the plurality of light source rows 100. The electric current detecting unit 400 includes a resistor 404. The cathodes of the light source rows 100 connect with one terminal of the resistor 404 via the respective resistors 405, and the other terminal of the resistor 404 is grounded.

Thereby, the voltage of the non-grounded terminal of the resistor 404 corresponds to the total electric current flowing through the plurality of light source rows 100. The voltage of the non-grounded terminal of the resistor 404 in the electric current detecting unit 400 is supplied to the electric current supplying unit 300 as the electric current detection voltage.

Anode between each of the cathodes of the light source rows 100 and corresponding one of the resistors 405 connects with the corresponding wire breakage detecting unit 200 to supply the voltage of the terminal as the wire breakage detection voltage.

Each of the wire breakage detecting units 200 includes a comparator 208 and a constant voltage source 210. For example, the constant voltage source 210 is a battery and outputs a predetermined voltage. The predetermined voltage is input into a positive input of the comparator 208, and the wire breakage detection voltage is input into a negative input of the comparator 208. The comparator 208 outputs an L signal (low level) when the wire breakage detection voltage is higher than the predetermined voltage, and, it outputs an H signal (high impedance or high level) when the wire breakage detection voltage is lower than the predetermined voltage. Thereby, each of the wire breakage detecting units 200 supplies the electric current supplying unit 300 with information on whether there is wire breakage of the corresponding light source row 100.

Alternatively, the configuration and function of the wire breakage detecting unit 200 in the present embodiment are similar to those of the wire breakage detecting unit 200 illustrated in FIG. 3, instead of employing those illustrated in FIG. 4. Similarly, the configuration and function of the wire breakage detecting unit 200 in the example illustrated in FIG. 3 may be similar to those of the wire breakage detecting unit 200 illustrated in FIG. 4, instead of employing those illustrated in FIG. 3.

The function and configuration of the electric current supplying unit 300 illustrated in FIG. 4 is similar to those of the electric current supplying unit 300 illustrated in FIG. 3. In this case, the reference voltage generating unit 375 adjusts the reference voltage according to the outputs of the wire breakage detecting units 200, which correspond to the respective light source rows 100, and outputs the reference voltage.

The reference voltage is input into the positive input of the operational amplifier 360, and the electric current detection voltage is input into the negative input of the operational amplifier instead of the average voltage described in reference to FIG. 3, and the operational amplifier 360 compares these two voltages, and the difference between the reference voltage and the electric current detection voltage is amplified and output to the electric current output unit 310. In this case, the electric current output unit 310 adjusts the output so that the electric current detection voltage may become substantially equal to the reference voltage. Thereby, the electric current supplying unit 300 outputs constant current such that the average voltage becomes equal to the reference voltage.

If the wire of one of the light source rows 100 is broken, the reference voltage generating unit 375 decreases the reference voltage according to the quantity of the wire-broken light source row 100. In this case, the electric current output unit 310 adjusts the electric current to be supplied to the light source rows 100 so that the electric current detection voltage becomes substantially equal to the decreased reference voltage. Thereby, the electric current detecting unit 400 decreases the electric current to be supplied to the light source rows 100 according to the quantity of the disconnected light source row 100. In this case, the electric current supplying unit 300 may decrease the current to be supplied to the light source rows 100 so as not to increase the electric current flowing through the light source row 100 of which the wire is not broken. According to the present embodiment, the electric current supplied to the semiconductor light emitting devices 102 is controllable highly accurately.

Figure 5:
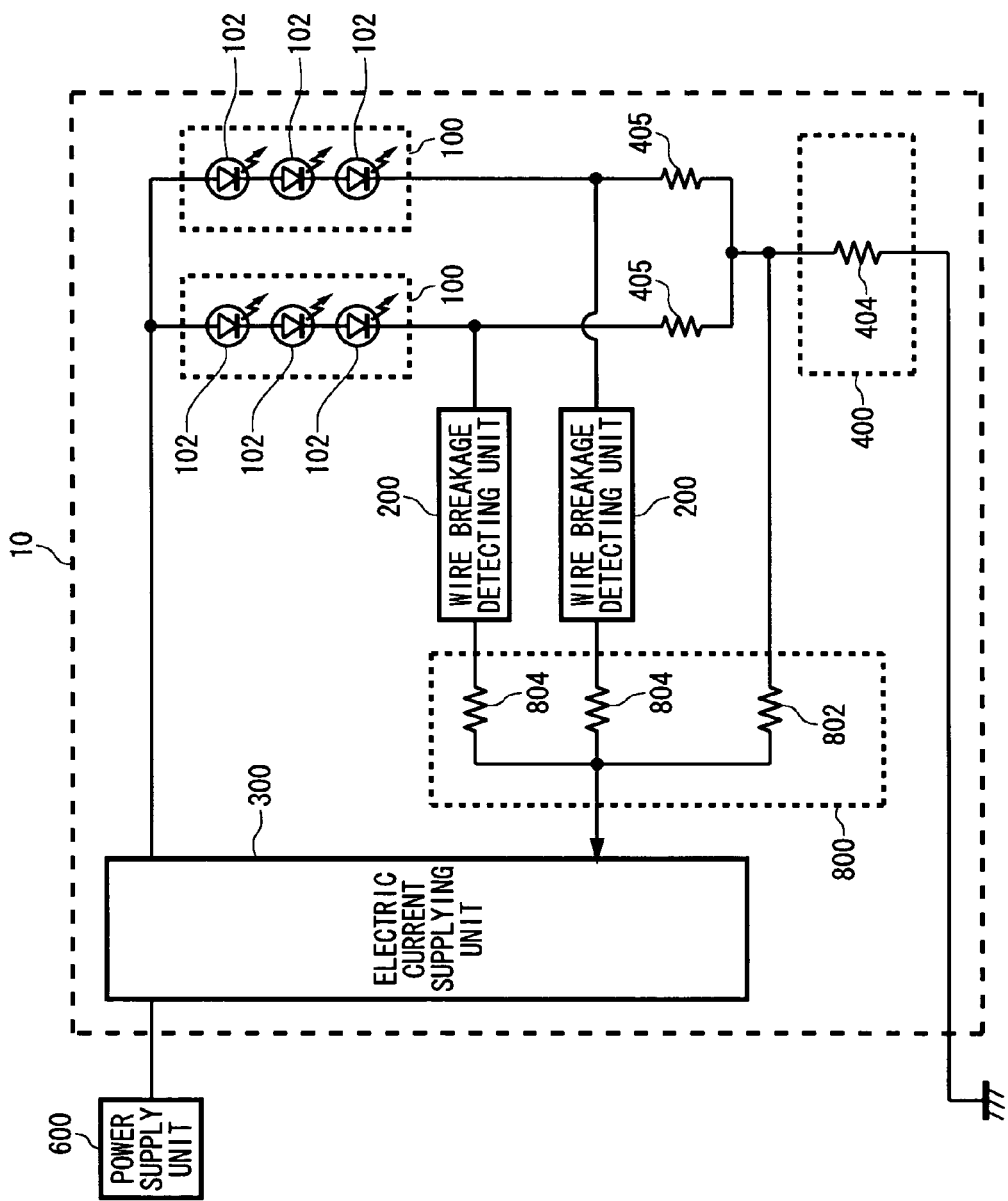
FIG. 5 is a circuit diagram illustrating a configuration of the vehicular lamp 10 and the power supply unit 600 according to still another embodiment of the present invention.

FIG. 5 is a circuit diagram illustrating still another example of a configuration of the vehicular lamp 10 and the power supply unit 600. The vehicular lamp 10 includes a plurality of light source rows 100, a plurality of wire breakage detecting units 200, an electric current supplying unit 300, a current detecting unit 400, a plurality of resistors 405, and an inversely proportional voltage output unit 800. The components illustrated in FIG. 5 that correspond to those of FIG. 1, FIG. 3 and FIG. 4 are numbered identically and the explanation of those components will be omitted to avoid redundancy.

In the present embodiment, each of the plurality of wire breakage detecting units 200 supplies the inversely proportional voltage output unit 800 with information on whether the wire of the corresponding light source row 100 is broken or not. The voltage of the upstream, non-grounded side of the electric current detecting unit 400 is supplied to the inversely proportional voltage output unit 800 as the electric current detection voltage.

The inversely proportional voltage output unit 800 includes a resistor 802 and a plurality of resistors 804. The plurality of resistors 804 are positioned corresponding to the plurality of light source rows 100. One terminal of each of the resistors 804 connects with the corresponding wire breakage detecting unit 200, and the other terminal of each of the resistors 804 connects with the electric current supplying unit 300. One terminal of the resistor 802 connects with the non-grounded side of the electric current detecting unit 400, and the other terminal of the resistor 802 connects with the electric current supplying unit 300 in parallel with the resistors 404.

In the present embodiment, the terminals of the plurality of resistors 804, being opposite to the terminals connecting with the wire breakage detecting unit 200, are connected together at the output of the inversely proportional voltage output unit 800.

In the present embodiment, the wire breakage detecting unit 200 outputs an L signal (low level signal) when the wire of the corresponding light source row 100 is not broken. In this case, the wire breakage detecting unit 200 allows the electric current to flow through the resistor 804 corresponding to the light source row 100 of which the wire is not broken, and the current flows to ground via the output of the inversely proportional voltage output unit 800.

Moreover, the wire breakage detecting unit 200 opens its output when the wire of the corresponding light source row 100 is broken. Therefore, electric current does not flow through the resistor 804 corresponding to the wire-broken light source row 100. Thereby, the plurality of resistors 804 reduce the voltage of the output of the inversely proportional voltage output unit 800 according to the quantity of the light source row 100 of which the wire is not broken.

Moreover, the output terminal of the inversely proportional voltage output unit 800 receives the electric current detection voltage from the electric current detecting unit 400 through the resistor 802. Therefore, when the wires of all the light source rows 100 are broken, the inversely proportional voltage output unit 800 outputs the electric current detection voltage to the electric current supplying unit 300. Moreover, when the wire of at least one of the light source rows 100 is not broken, the electric current detection voltage is decreased according to the quantity of the light source row 100 of which the wire is not broken, and the inversely proportional voltage output unit 800 outputs the decreased voltage to the electric current supplying unit 300. Therefore, in the present embodiment, the more the quantity of the broken wires of the light source rows 100 are, the higher the output voltage from the inversely proportional voltage output unit 800 becomes.

Suppose that the vehicular lamp 10 includes n number of light source rows 100 and the wires of N number of light source rows 100 are broken (where, $N \leq n$). In this case, the output voltage of the inversely proportional voltage output unit 800 will be $y/(y+x \cdot (n-N)) \cdot V$, where x is a value of resistance of the resistor 802, y is a value of resistance of each of the resistors 804, and V is the electric current detection voltage. Moreover, when the value of the resistance of each of the resistors 804 is so low that the electric resistance y of each of the resistors 804 can negligible compared with the electric resistance x of the resistor 802, the output voltage of the inversely proportional voltage output unit 800 will be $y/(x \cdot (n-N)) \cdot V$. In this case, the output voltage from the inversely proportional voltage output unit 800 is in inverse proportion to the quantity of the light source rows 100 of which the wires are not broken.

Alternatively, the configuration and function of the electric current supplying unit 300 in the present embodiment illustrated in reference to FIG. 5 are similar to those of the electric current supplying unit 300 illustrated in FIG. 1. In this case, the electric current supplying unit 300 adjusts its output so that the output voltage from the inversely proportional voltage output unit 800 may become substantially equal to the reference voltage of the constant voltage source 370 (refer to FIG. 1). The electric current supplying unit 300 decreases the output current to be supplied to the light source rows 100 so that the output voltage from the inverse proportion voltage output unit 800 may become substantially equal to the reference voltage. Therefore, according to the present embodiment, the electric current to be supplied to the light source rows 100 is controllable highly accurately.

The vehicular lamp to which the present invention may be applied to includes, but not limited to, headlamp, tail lamp, back-up lamp and turn-signal lamp of automobiles, motorcycles and trains, and the headlamp includes but not limited to regular headlamp, fog lamp and cornering lamp.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As is obvious from the description above, according to the present invention, the vehicular lamp 10 can appropriately control the electric current to be supplied to the light source rows 100.

What is claimed is:

1. A vehicular lamp, comprising:
a plurality of semiconductor light emitting devices connected in parallel;
a wire breakage detecting unit detecting wire breakage of each of said plurality of semiconductor light emitting devices;
an electric current supplying unit supplying a first electric current to said plurality of semiconductor light emitting devices,
a plurality of electric current detecting units corresponding to said plurality of semiconductor light emitting devices, each of said plurality of electric current detecting units detecting electric current flowing through corresponding one of said plurality of semiconductor light emitting devices;
an average electric current value output unit selecting at least one of said plurality of electric current detecting units corresponding to respective one(s) of said plurality of semiconductor light emitting devices of which the wire breakage is not detected by said corresponding wire breakage detecting unit, and outputting an average value of electric current detected by said selected electric current detecting unit, wherein
said average value is an average of a current flowing through all working branches, and
said electric current supplying unit decreases the electric current to be supplied to said plurality of semiconductor light emitting devices from the first electric current to a second electric current, which is lower than the first electric current, when said wire breakage detecting unit detects wire breakage of at least one of said plurality of semiconductor light emitting devices, such that the average value is maintained substantially constant when at least one of said wire breakage detecting units detects wire breakage of respective one(s) of said semiconductor light emitting devices.

2. The vehicular lamp as claimed in claim 1, wherein said electric current supplying unit decreases the electric current to be supplied to said plurality of semiconductor light emitting devices from the second electric current to a third electric current, which is lower than the second electric current, when said wire breakage detecting unit detects wire breakage of at least two of said plurality of semiconductor light emitting devices.

* * * * *